(12) United States Patent
Sawada et al.

(10) Patent No.: US 10,404,131 B2
(45) Date of Patent: Sep. 3, 2019

(54) DYNAMO-ELECTRIC MACHINE

(71) Applicant: HITACHI AUTOMOTIVE SYSTEMS, LTD., Hitachinaka-shi, Ibaraki (JP)

(72) Inventors: Itsurou Sawada, Tokyo (JP); Riichi Nagao, Tokyo (JP); Shinji Yamazaki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 348 days.

(21) Appl. No.: 15/304,593

(22) PCT Filed: Apr. 8, 2015

(86) PCT No.: PCT/JP2015/060910
§ 371 (c)(1),
(2) Date: Oct. 17, 2016

(87) PCT Pub. No.: WO2015/166772
PCT Pub. Date: Nov. 5, 2015

(65) Prior Publication Data
US 2017/0047809 A1 Feb. 16, 2017

(30) Foreign Application Priority Data
Apr. 28, 2014 (JP) .................................. 2014-092217

(51) Int. Cl.
*H02K 5/20* (2006.01)
*H02K 9/19* (2006.01)
(52) U.S. Cl.
CPC ................. *H02K 5/20* (2013.01); *H02K 9/19* (2013.01)

(58) Field of Classification Search
CPC .. H02K 5/20; H02K 9/19; H02K 5/24; H02K 9/193
USPC ........................................................... 310/54
See application file for complete search history.

(56) References Cited

U.S. PATENT DOCUMENTS

| 2004/0135443 A1* | 7/2004 | Tajima | ..................... H02K 5/20 |
| | | | 310/68 D |
| 2013/0169077 A1* | 7/2013 | Takei | ....................... H02K 5/20 |
| | | | 310/54 |
| 2016/0056683 A1* | 2/2016 | Nakanishi | ................ H02K 5/18 |
| | | | 310/54 |

(Continued)

FOREIGN PATENT DOCUMENTS

| JP | 2009-148115 A | 7/2009 |
| JP | 2009-247085 A | 10/2009 |

(Continued)

*Primary Examiner* — Forrest M Phillips
(74) *Attorney, Agent, or Firm* — Volpe and Koenig, P.C.

(57) ABSTRACT

A dynamo-electric machine reduces the increase in temperature of a stator close to a cooling liquid outlet and a stator end portion, and that has excellent cooling performance. The dynamo-electric machine is provided with: a stator, a rotor that is held on the inner-diameter-side of the stator across a predetermined gap so as to be capable of rotating; and a housing that is located on the outer-diameter-side of the stator and holds the stator and the rotor. The housing is provided with a cooling liquid channel through which a cooling liquid flows, the radial height of the cooling liquid channel within the housing differing depending on the axial position of the rotor.

5 Claims, 14 Drawing Sheets

(56) References Cited

U.S. PATENT DOCUMENTS

| | | | | |
|---|---|---|---|---|
| 2016/0141938 A1* | 5/2016 | Chang | ................... | H02K 9/197 310/54 |
| 2016/0164377 A1* | 6/2016 | Gauthier | ................. | H02K 9/19 310/54 |
| 2016/0164378 A1* | 6/2016 | Gauthier | ................. | H02K 1/32 310/54 |
| 2016/0380504 A1* | 12/2016 | Imura | ..................... | H02K 5/18 310/54 |

FOREIGN PATENT DOCUMENTS

| | | |
|---|---|---|
| JP | 2012-244659 A | 12/2012 |
| JP | 2013-141334 A | 7/2013 |
| JP | 2013-172546 A | 9/2013 |

\* cited by examiner

DYNAMO-ELECTRIC MACHINE

TECHNICAL FIELD

The present invention relates to a structure of a rotating electric machine.

BACKGROUND ART

Rotating electric machines include a rotor which rotates about a rotating shaft, a stator disposed opposite to a circumferential surface of the rotor and with a stator coil winded around a stator core, and a housing which fixes the stator and rotatably holds the rotor.

When a rotating electric machine is operated as an electric motor, an AC current is fed to the stator coil and a rotating magnetic field is generated, thereby giving turning force to the rotor to obtain mechanical output. Meanwhile, when a rotating electric machine is operated as a generator, turning force is externally given to the rotor to allow the rotor to rotate, thereby obtaining electric output generated at the stator coil.

When a rotating electric machine is operated as an electric motor or a generator in this manner to obtain mechanical output or electric output, the stator coil and the stator core generate heat due to loss of the rotating electric machine. An insulating material used for the rotating electric machine has an upper limit temperature that allows for maintaining insulating performance. Therefore, in order to maintain the temperature of the insulating material of the rotating electric machine to be less than or equal to the upper limit temperature, it is required to cool the rotating electric machine by some method when the rotating electric machine is operated.

Classifying cooling methods of the rotating electric machine by a medium used for cooling, the methods are divided into gas cooling methods using gas such as the air or hydrogen as a cooling medium and liquid cooling methods using liquid such as cooling water or cooling oil as a cooling medium.

Of the above, the liquid cooling methods can be classified into indirect cooling methods to indirectly cool a stator core and a stator coil by cooling a housing by circulating cooling liquid in a passage included in the housing and direct cooling methods to cool a stator core or a stator coil that is a portion generating heat by bringing cooling liquid, such as cooling oil having electric insulation property, into direct contact with the stator core or the stator coil.

It is known that in the indirect cooling methods a passage structure of the cooling liquid significantly influence cooling performance. For example, PTL 1 discloses a passage structure of a housing that allows for suppressing deterioration of cooling efficiency due to stagnation of cooling water.

CITATION LIST

Patent Literature

PTL 1: JP 2009-247085 A

SUMMARY OF INVENTION

Technical Problem

In rotating electric machines of the indirect cooling methods, however, a temperature rise at an end portion of a stator is higher than a temperature rise at the central portion of the stator due to the following reasons.

A housing and a stator are in contact with each other at apart of a stator core where electrical steel plates are laminated, thereby radiating heat generated at the stator into cooling liquid in the housing. Generation of heat at the stator is attributable to iron loss generated at the stator core and copper loss generated at the stator coil. Of the above, the copper loss is equivalent to Joule heat generated by a current flowing in the stator coil. This is generated at a stator coil thick portion inserted in the laminated portion of the stator core and at a stator coil end portion protruding from an end portion of the stator core in the axial direction for winding around the stator core. The copper loss generated at the stator coil thick portion is transferred to the stator core in contact therewith and the heat is radiated to the cooling liquid via the housing. However, the copper loss generated at the stator coil end portion that is not in contact with the stator core is transferred to the stator coil thick portion and then transferred to the stator core and the heat is radiated to the cooling liquid via the housing. Therefore, the stator coil end portion has a higher temperature as compared to that of the stator coil thick portion.

Furthermore, the cooling liquid absorbs the heat radiated from the stator while flowing in the passage in the housing and thus a cooling liquid temperature rises while the cooling liquid flows in the passage in the housing. Therefore, the passage near a cooling liquid inlet lets the cooling liquid of a low temperature flow and thus has high heat radiation performance while the passage near a cooling liquid outlet lets the cooling liquid of a high temperature flow and thus has low heat radiation performance. Thus, there is a problem that a stator temperature near the cooling liquid outlet becomes higher than a stator temperature near the cooling liquid inlet.

An object of the present invention is to provide a rotating electric machine having excellent cooling performance where a temperature rise at a stator end portion and a stator near a cooling liquid outlet is mitigated.

Solution to Problem

In order to solve the above problem, configurations described in claims are employed for example.

The present application includes a plurality of means to solve the above problem. One example of the means includes a stator; a rotor rotatably held on an inner diameter side of the stator via a predetermined gap; and a housing positioned on an outer diameter side of the stator, the housing retaining the stator and the rotor. The housing includes a cooling liquid passage which distributes cooling liquid. The height in a radial direction of the cooling liquid passage of the housing is different depending on a position in an axial direction of the rotor.

Advantageous Effects of Invention

The present invention allows for providing a rotating electric machine having excellent cooling performance where a temperature rise at a stator end portion and a stator near a cooling liquid outlet is mitigated.

DESCRIPTION OF EMBODIMENTS

Embodiments will be described below with reference to the drawings.

Incidentally, in the descriptions below, an "axial direction" refers to a direction along a rotating shaft of a rotor of a rotating electric machine. A "circumferential direction" refers to a direction along a rotating direction of the rotor of the rotating electric machine. A "radial direction" refers to a radius vector direction (radial direction) when the rotating shaft of the rotor of the rotating electric machine is regarded as the center. An "inner periphery side" refers to an inner side (inner diameter side) of the radial direction while an "outer periphery side" refers to the opposite, that is, an outer side (outer diameter side) of the radial direction.

First Embodiment

A rotating electric machine of a first embodiment of the present invention will be described with FIGS. 1 to 3.

Figure 1:
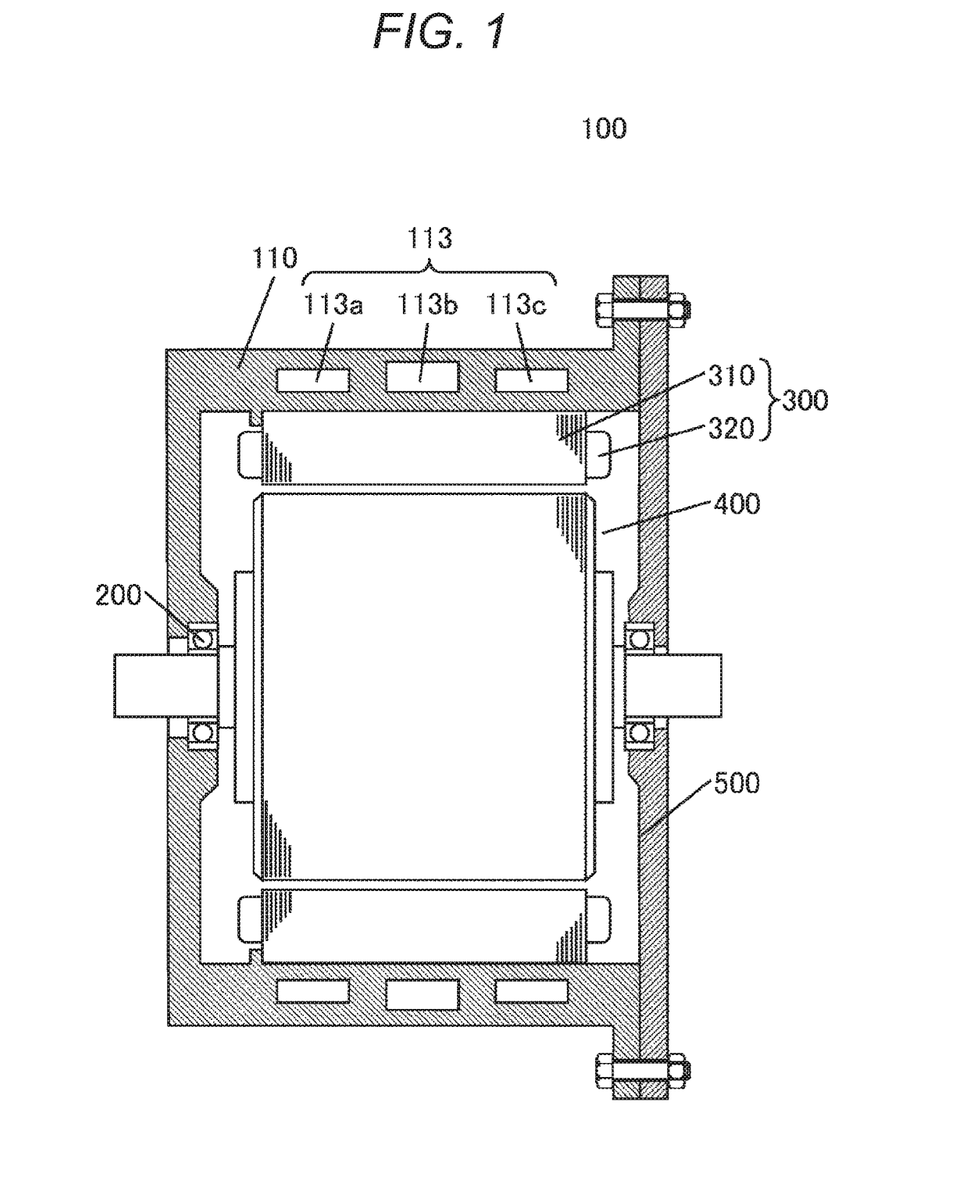
FIG. 1 is a cross-sectional view of a rotating electric machine according to a first embodiment.

FIG. 1 illustrates a cross-sectional view of a rotating electric machine 100 of the first embodiment of the present invention.

The rotating electric machine 100 of the first embodiment of the present invention includes a housing 110, a stator 300 fixed to the housing, a rotor 400 rotatably supported by a bearing 200 fixed to the housing 110, and an end bracket 500 to be attached to an end portion, in the axial direction, of the housing 110.

The stator 300 includes a stator core 310 formed by lamination of thin electrical steel plates, a stator coil 320, and an insulating material (not illustrated) to electrically insulate the stator core 310 and the stator coil 320.

The housing 110 includes a passage 113 to let cooling liquid flow to cool the rotating electric machine.

Figure 2:
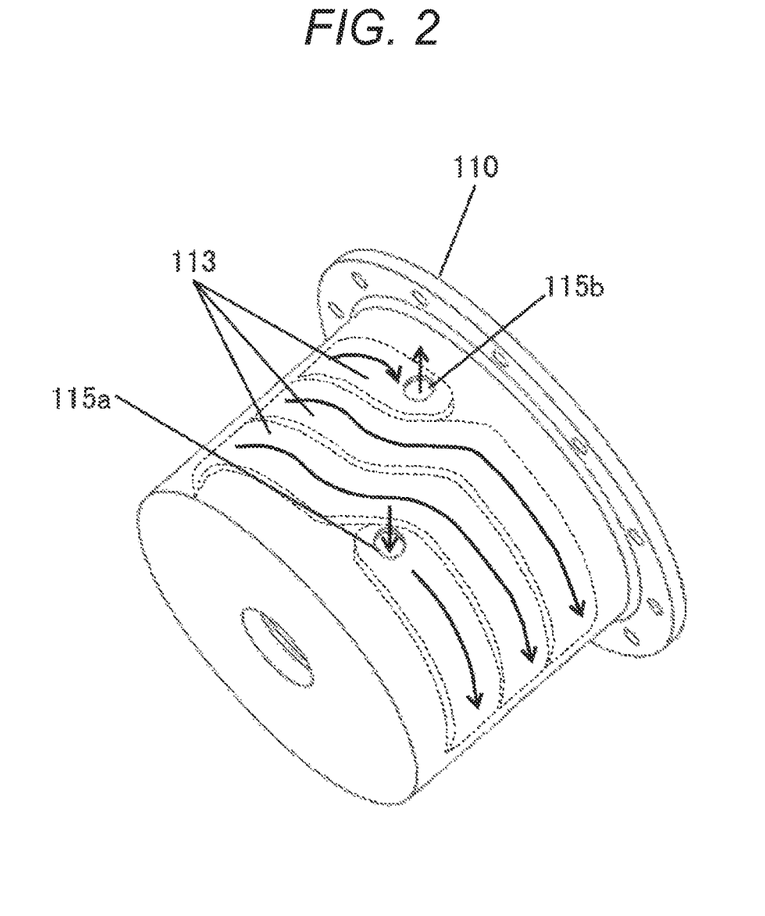
FIG. 2 is a perspective view of a housing of the rotating electric machine according to the first embodiment.

FIG. 2 illustrates the housing 110 of the rotating electric machine of the first embodiment of the present invention. In FIG. 2, an object illustrated by broken lines is a cooling liquid passage inside the housing 110. A solid line arrow in FIG. 2 illustrates a direction of a flow of cooling liquid.

In the first embodiment of the present invention, the height of the cooling liquid passage 113 (thickness in the radial direction) is different depending on a position in the axial direction where the cooling liquid passage 113 in the housing 110 is included in the housing 110 by a plurality of rounds in the circumferential direction as illustrated in FIG. 2.

In FIG. 1, the height of passages 113a and 113b at the both ends in the axial direction is lower than the height of the central portion 113b in the axial direction. This allows the passages 113a and 113c to have a cross-sectional area smaller than a cross-sectional area of the passage 113b and thus have a larger flow rate when cooling liquid flows therein. This results in higher cooling performance of the passages 113a and 113c than cooling performance of the passage 113b, thereby allowing for mitigating a temperature rise at the end portions of the stator 300 in the axial direction.

Figure 3:
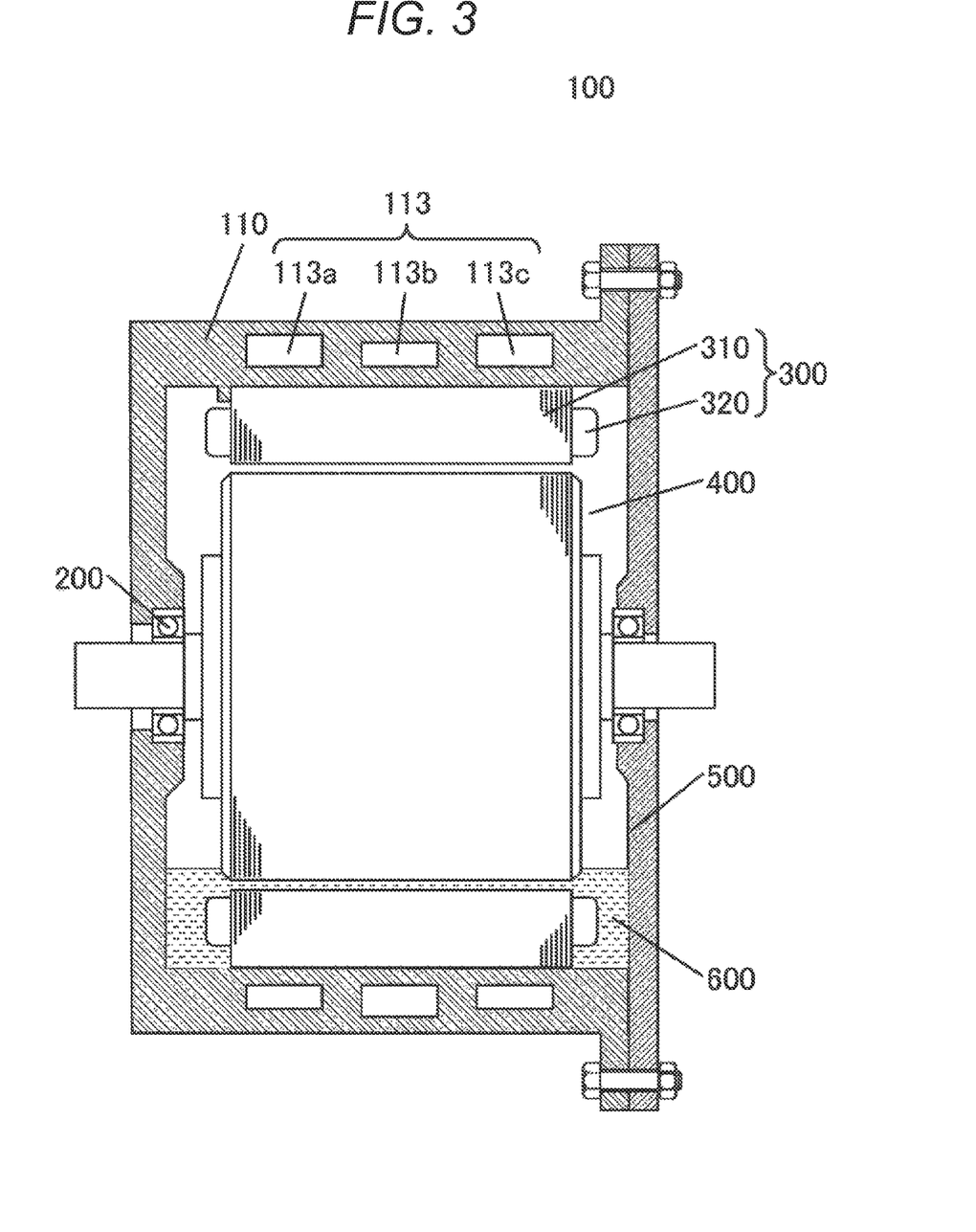
FIG. 3 is a cross-sectional view of the rotating electric machine according to the first embodiment.

Alternatively, as illustrated in FIG. 3, the height of a cooling liquid passage 113b in the central portion in the axial direction may be lower than those of cooling liquid passages 113a and 113c at the end portions in the axial direction, thereby enhancing cooling performance in the central portion in the axial direction. This is effective when, as illustrated in FIG. 3, cooling oil 600 having insulation property is sealed inside a rotating electric machine and direct cooling by the cooling oil 600 and indirect cooling by cooling liquid flowing in a cooling liquid passage 113 of a housing 110 are combined. In this case, end portions of a stator coil 320 in the axial direction are cooled by the cooling oil and thus a temperature at the central portion in the axial direction may be higher than a temperature at the end portions in the axial direction. In this case, as illustrated in FIG. 3, by lowering the height of the cooling liquid passage 113b in the central portion in the axial direction than those of the cooling liquid passages 113a and 113c at the end portions in the axial direction and thereby enhancing cooling performance in the central portion in the axial direction, a temperature rise in the central portion in the axial direction can be mitigated.

Incidentally, the cooling liquid passage 113 is formed by three rounds in the circumferential direction in FIGS. 1 to 3; however, this does not limit the number of rounds. The characteristic of the present invention is to vary the height of cooling liquid passages of a plurality of rounds depending on a position thereof.

Second Embodiment

Figure 4:
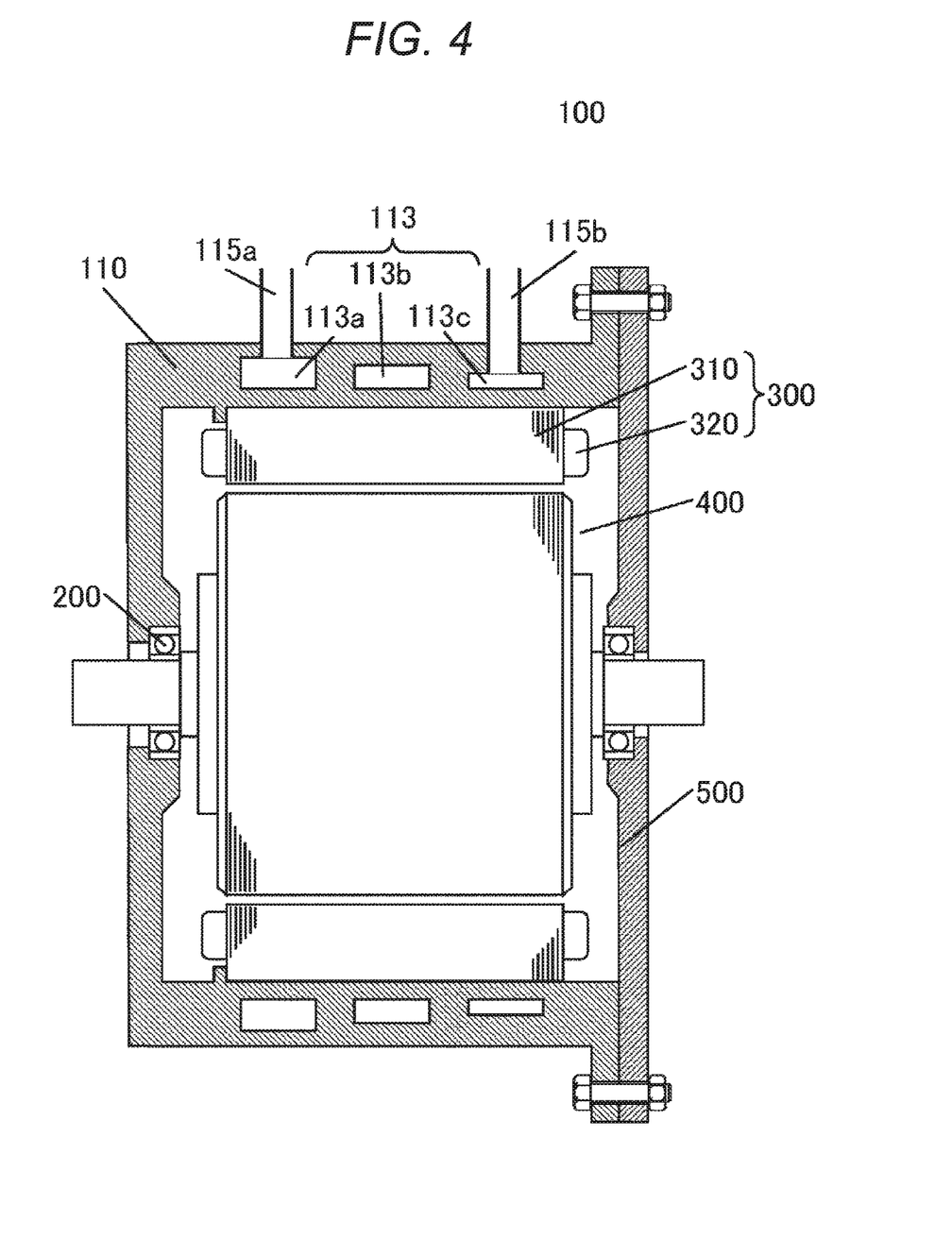
FIG. 4 is a cross-sectional view of a rotating electric machine according to a second embodiment.

A rotating electric machine of a second embodiment of the present invention will be described with FIG. 4. FIG. 4 is a cross-sectional view of the rotating electric machine of the second embodiment of the present invention.

In the rotating electric machine of the second embodiment of the present invention, the height in the radial direction of a cooling liquid passage 113 included in the housing 110 varies depending on a position in the axial direction. A cooling liquid inlet 115a is provided to a cooling liquid passage 113a having a high height in the radial direction while a cooling liquid outlet 115b is provided to a cooling liquid passage 113c having a low height in the radial direction.

The cooling liquid passage 113a provided with the cooling liquid inlet 115a has a high height in the radial direction and a large cross-sectional area and thus has a small heat transfer coefficient but can obtain high cooling performance since the temperature of cooling liquid is low thereat.

Meanwhile, in the cooling liquid passage 113c provided with the cooling liquid outlet 115b, since the cooling liquid absorbs the heat generated by the rotating electric machine while flowing in the cooling liquid passage, the cooling liquid temperature becomes higher than that of the cooling liquid flowing in the cooling liquid passage 113. However, since the height in the radial direction is low and the cross-sectional area of the passage is small, a high heat transfer coefficient can be obtained. As a result of this, a temperature rise of the rotating electric machine near the cooling liquid outlet attributable to a temperature rise of the cooling liquid can be mitigated.

Third Embodiment

Figure 5:
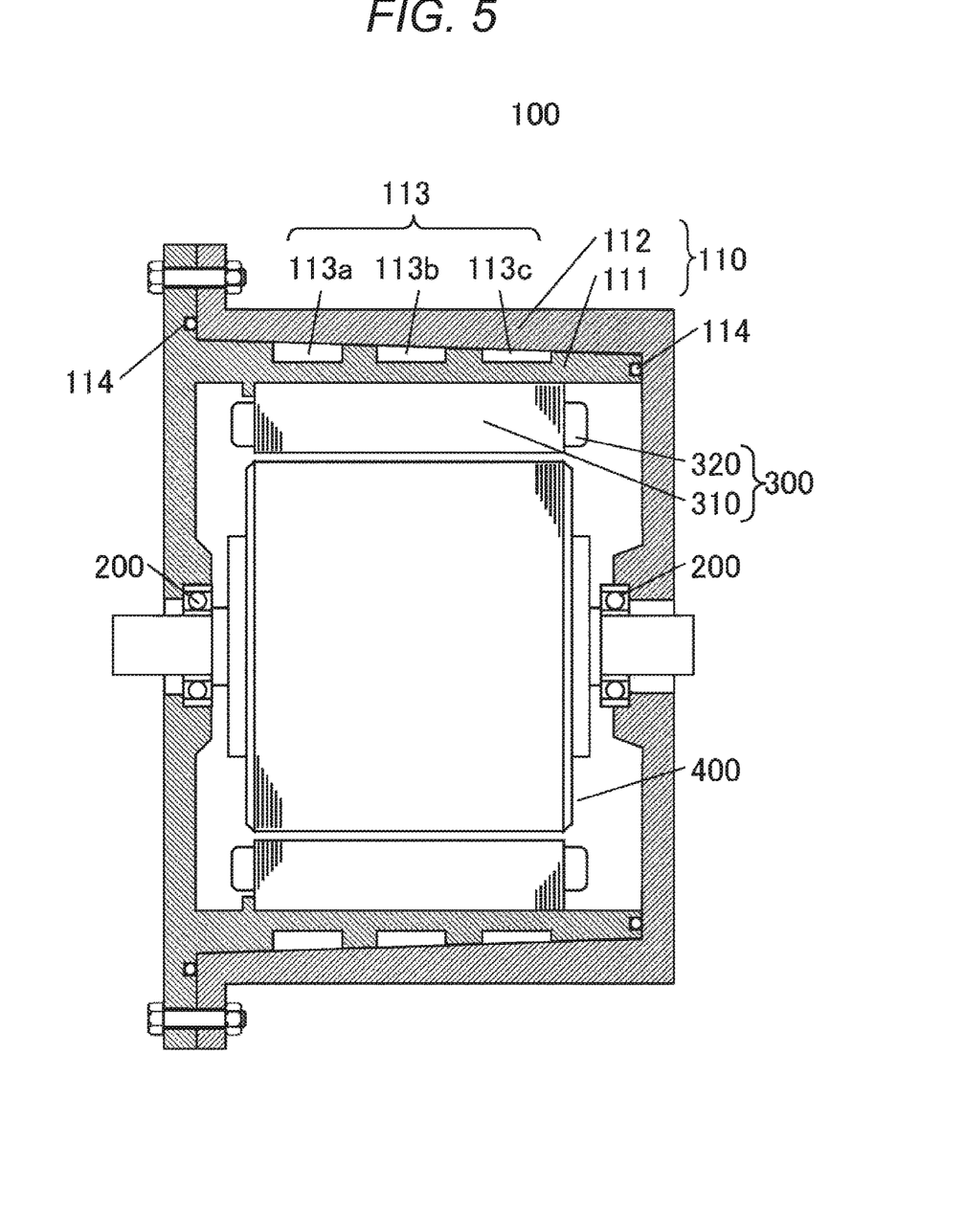
FIG. 5 is a cross-sectional view of a rotating electric machine according to a third embodiment.
Figure 6:
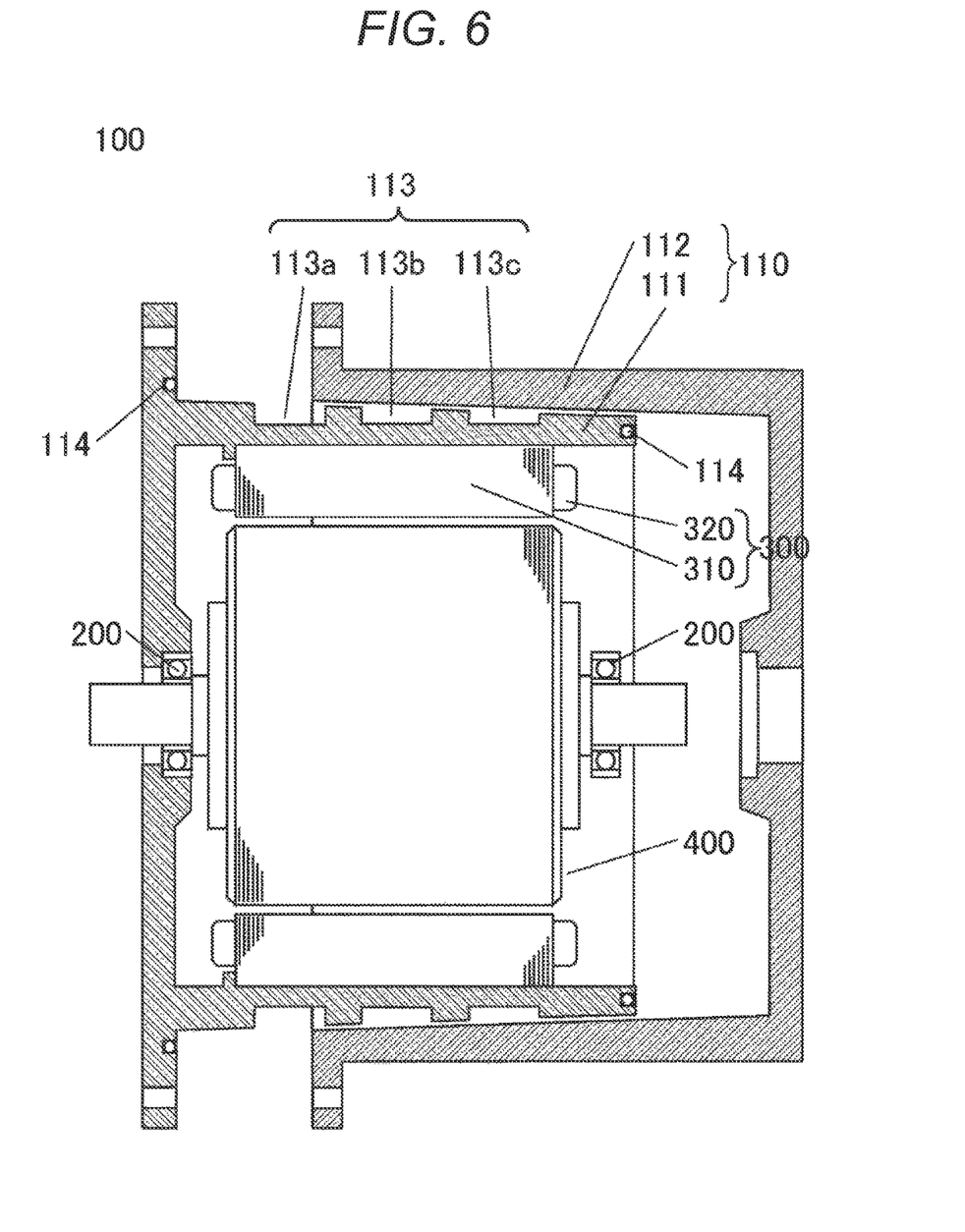
FIG. 6 is an exploded cross-sectional view of the rotating electric machine according to the third embodiment.
Figure 9:
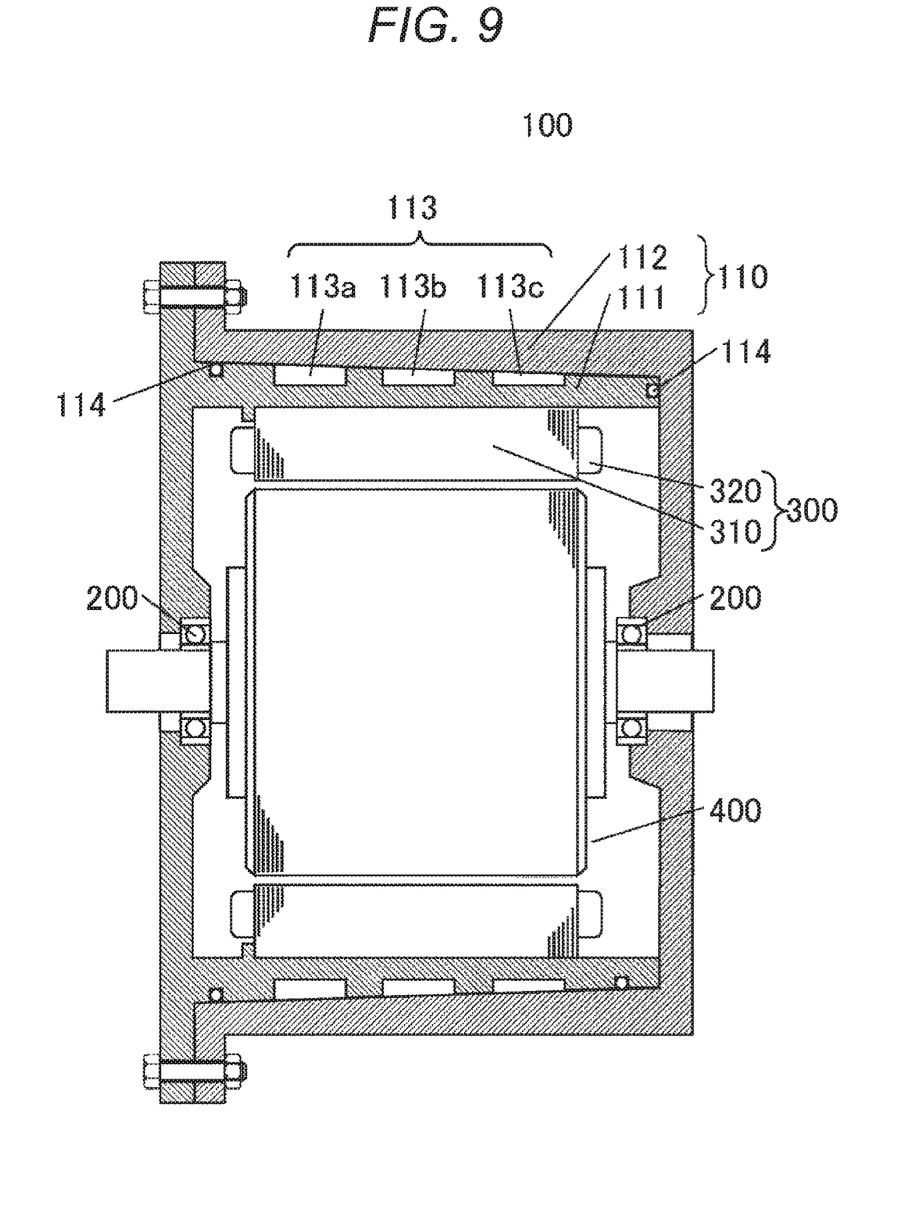
FIG. 9 is a cross-sectional view of the rotating electric machine according to the third embodiment.

A rotating electric machine of a third embodiment of the present invention will be described with FIGS. 5 and 9. FIG. 5 is a cross-sectional view of the rotating electric machine of the third embodiment of the present invention. FIG. 6 is an exploded cross-sectional view of the rotating electric machine of the third embodiment of the present invention.

In the rotating electric machine of the third embodiment of the present invention, a housing 110 has a double cylinder structure of an inner cylinder 111 and an outer cylinder 112. An outer diameter surface 111a of the inner cylinder 111 and an inner diameter surface 112a of the outer cylinder 112 are inclined in the axial direction and the outer diameter surface 111a of the inner cylinder 111 includes a groove that forms a cooling liquid passage 113.

Since the outer diameter surface 111a of the inner cylinder 111 is inclined in the axial direction, a cross-sectional area of the cooling liquid passage 113 decreases gradually from the left to the right in FIG. 5. Due to this, by providing a cooling liquid inlet 115a to a passage 113a having the largest cross-sectional area and providing a cooling liquid outlet 115b to a cooling liquid passage 113c having the smallest cross-sectional area, influence of a temperature rise of the cooling liquid can be removed like in the rotating electric machine of the second embodiment of the present invention.

Moreover, an outer diameter of the inner cylinder 111, at a position in contact with the outer cylinder 112 when the inner cylinder 111 and the outer cylinder 112 are assembled, is formed to be smaller than an inner diameter of the outer cylinder 112 and thereby a fastening margin is set such that the inner cylinder 111 is fastened by the outer cylinder 112 in the inner diameter direction. This allows for fastening the stator 300 and the inner cylinder 111 to each other.

Figure 7:
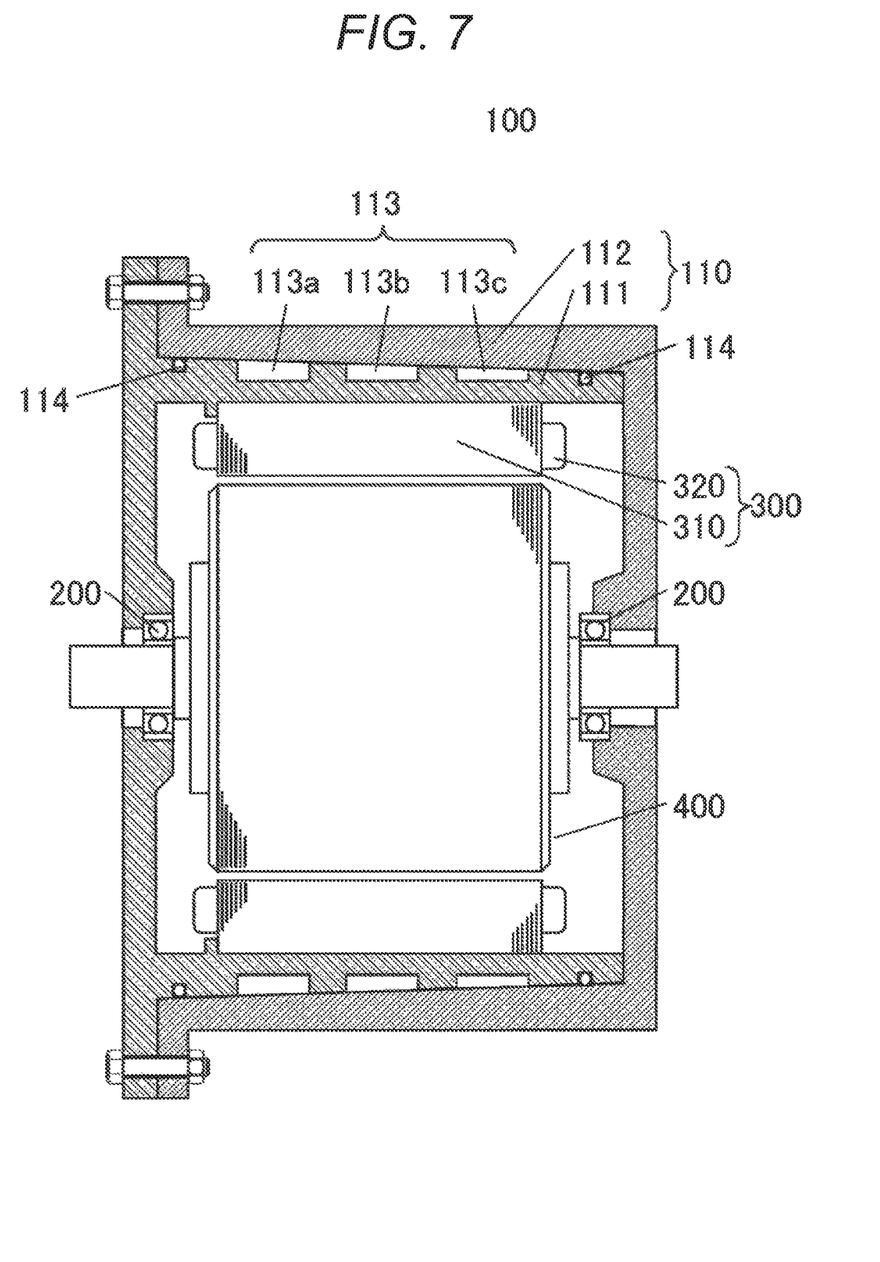
FIG. 7 is a cross-sectional view of the rotating electric machine according to the third embodiment.
Figure 8:
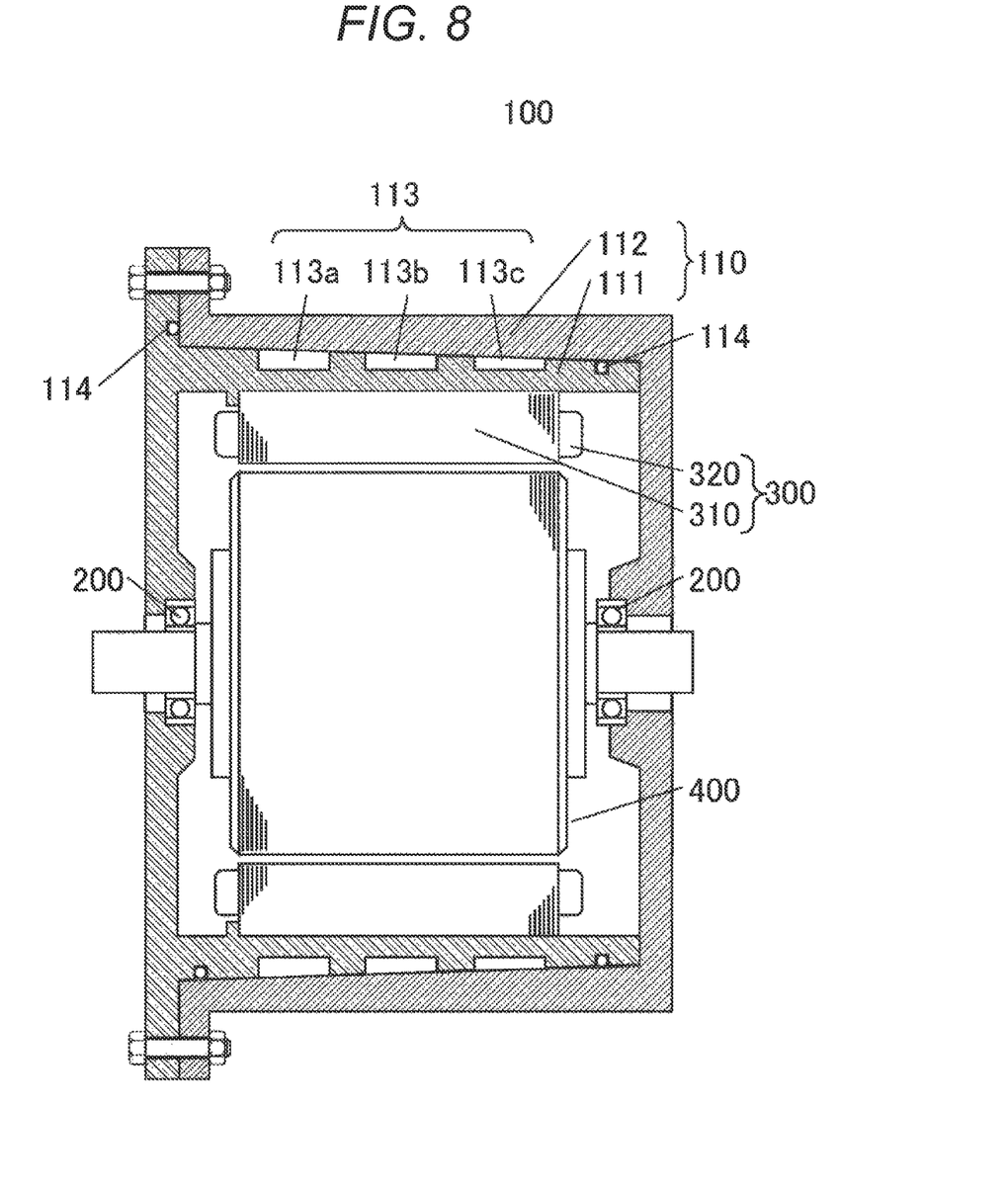
FIG. 8 is a cross-sectional view of the rotating electric machine according to the third embodiment.

In FIGS. 5 and 6, seal portions 114 of the inner cylinder 111 and the outer cylinder 112 are provided on end surfaces of the inner cylinder 111 in the axial direction; however, this does not specifically specify a position of the seal portion. As illustrated in FIGS. 7 to 9, two seal portions 114 may be provided on an outer diameter surface of the inner cylinder 111 or one seal portion may be provided on an outer diameter surface of an inner cylinder 111 while the other seal portion 114 is provided on an end surface of the inner cylinder 111 in the axial direction.

Fourth Embodiment

A fourth embodiment of the present invention will be described with FIG. 10.

Figure 10:
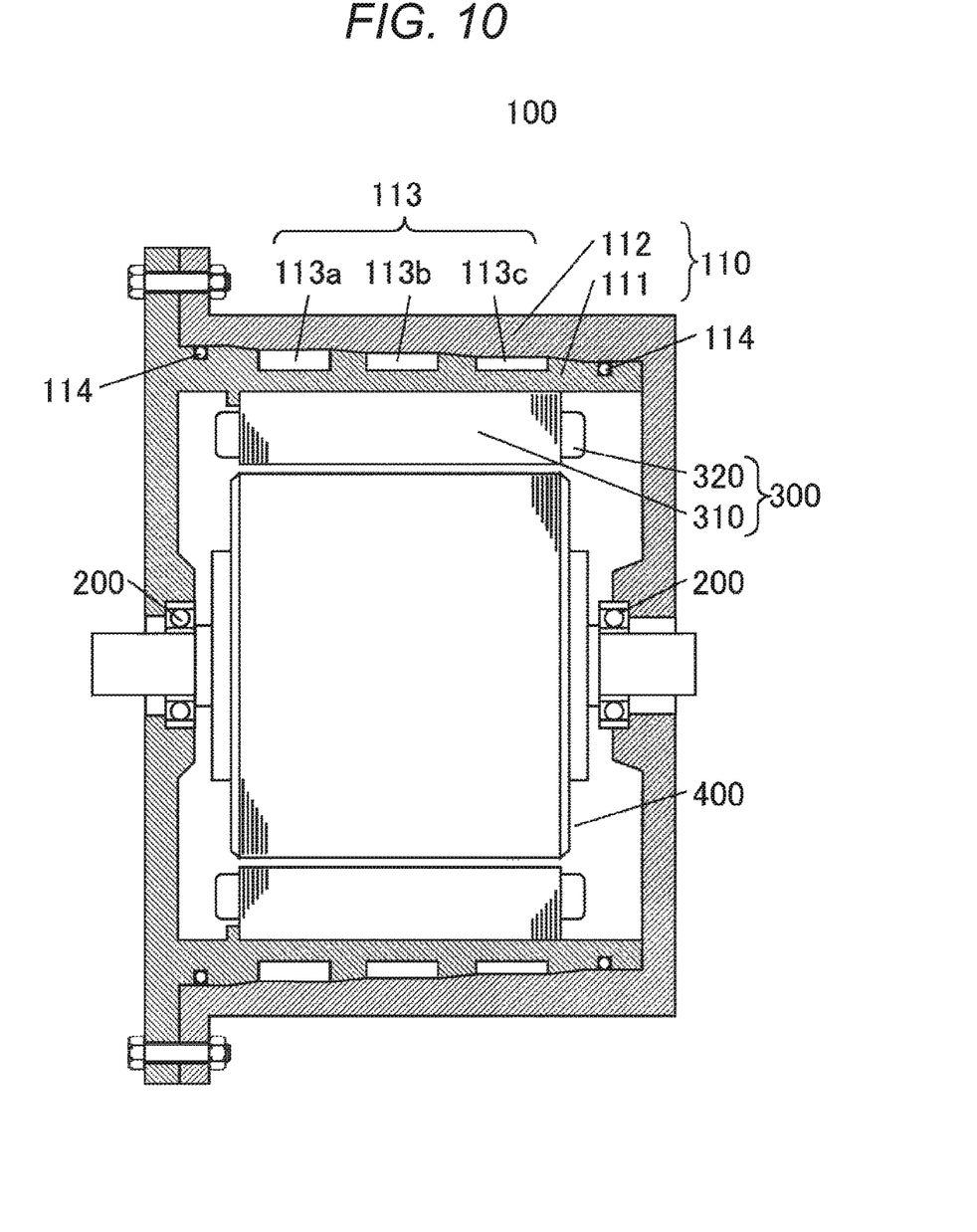
FIG. 10 is a cross-sectional view of a rotating electric machine according to a fourth embodiment.

FIG. 10 is a cross-sectional view of a rotating electric machine illustrating the fourth embodiment of the present invention.

The fourth embodiment of the present invention has a double cylinder structure where a housing 110 is formed by an inner cylinder 111 and an outer cylinder 112 like in the third embodiment. However, only a part where the inner cylinder 111 and the outer cylinder 112 are in contact with each other is inclined in the axial direction while the inner diameter of a part of the outer cylinder 112 where a cooling liquid passage 113 is formed is constant.

Fifth Embodiment

A fifth embodiment of the present invention will be described with FIGS. 11 and 12.

Figure 11:
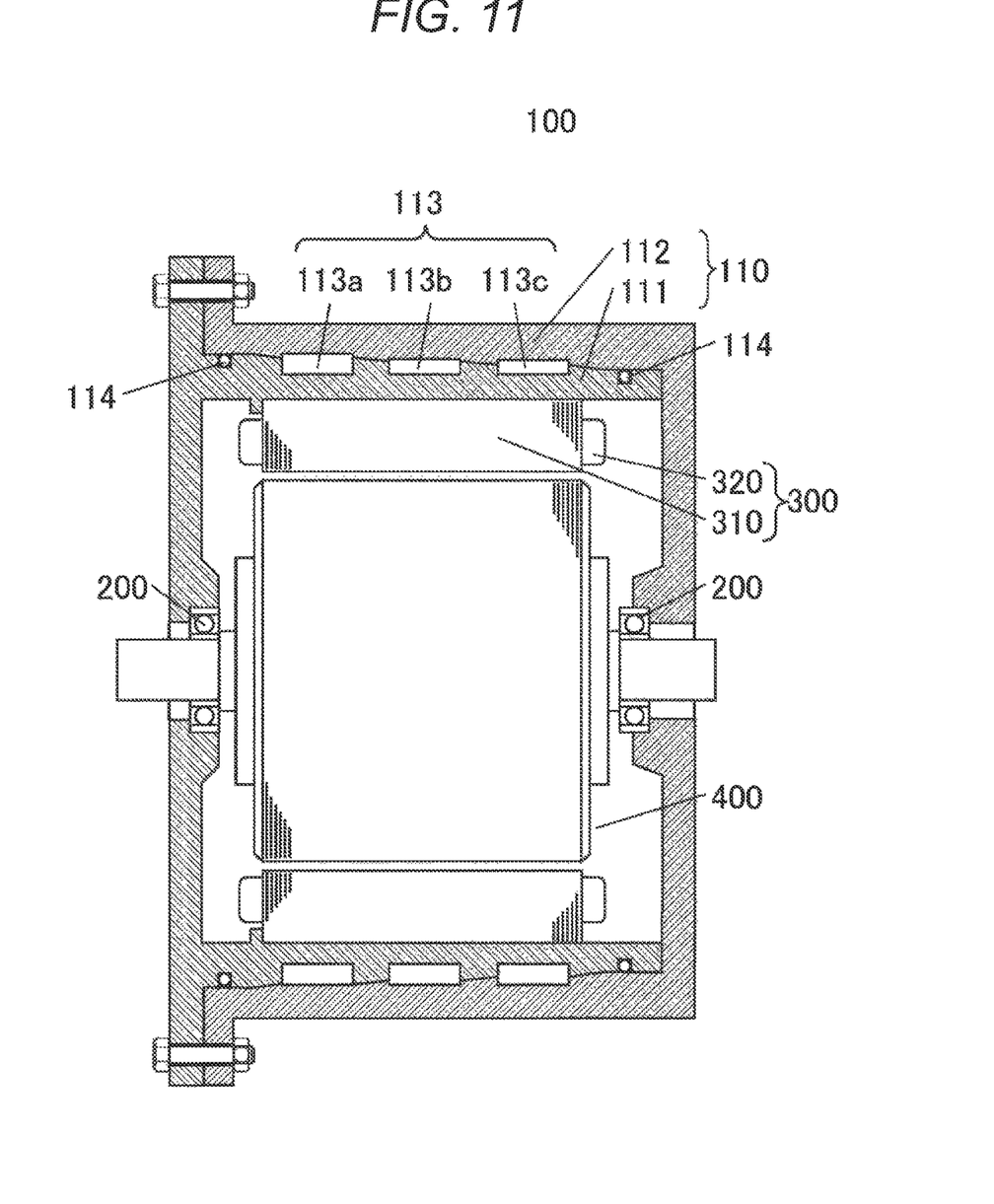
FIG. 11 is a cross-sectional view of a rotating electric machine according to a fifth embodiment.
Figure 12:
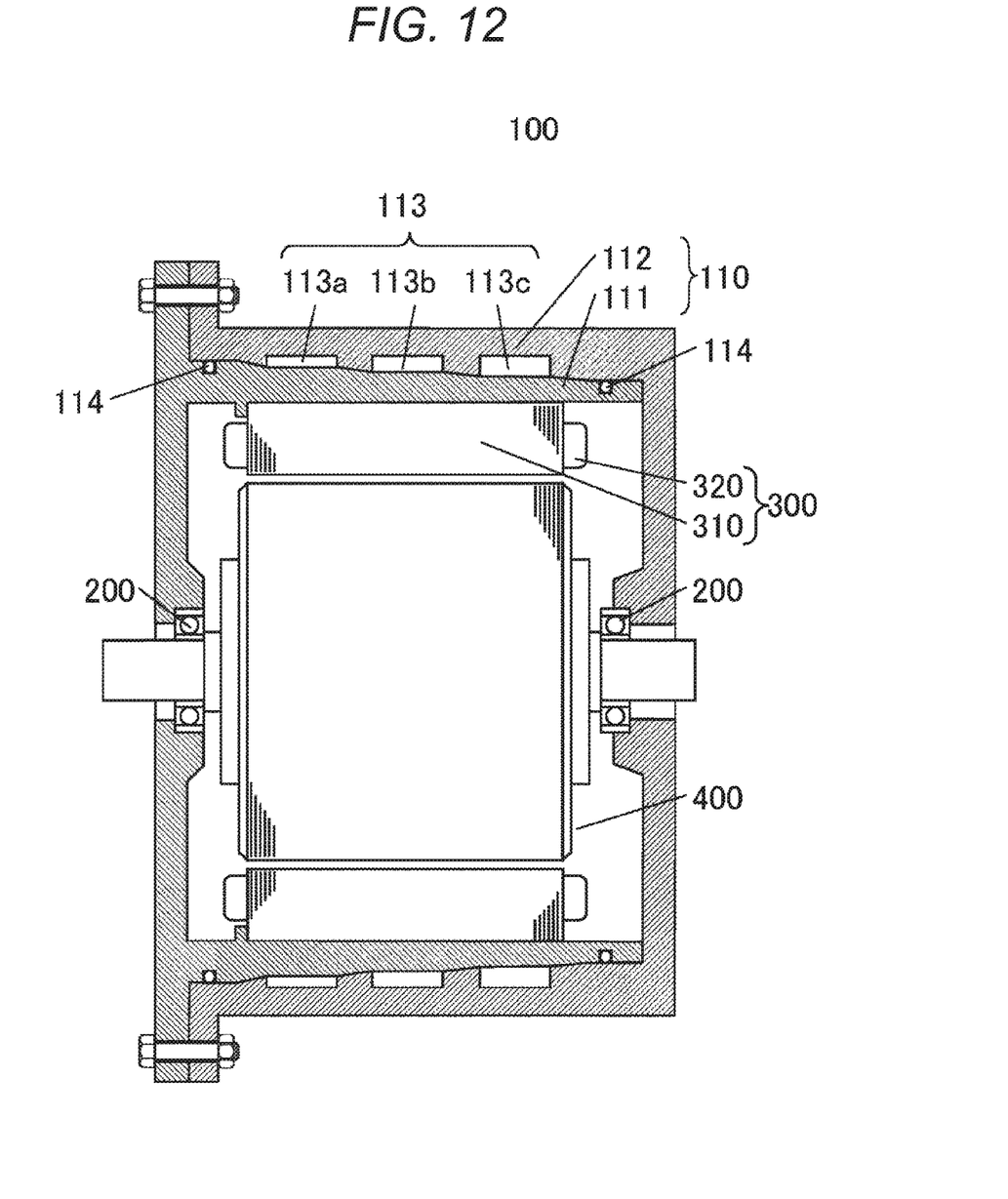
FIG. 12 is a cross-sectional view of the rotating electric machine according to the fifth embodiment.

FIGS. 11 and 12 are cross-sectional views of a rotating electric machine illustrating the fifth embodiment of the present invention.

The fifth embodiment of the present invention has a double cylinder structure where a housing 110 is formed by an inner cylinder 111 and an outer cylinder 112 like in the third and the fourth embodiments. However, a cooling liquid passage is included in both of an outer diameter side of the inner cylinder 111 and an inner diameter side of the outer cylinder 112 or only on an inner diameter side of the outer cylinder 112.

This allows for changing cooling performance by changing only the outer cylinder 112 without changing the stator 300, the rotor 200, or the inner cylinder 111 when cooling conditions (for example a cooling liquid temperature or the like) of the rotating electric machine are changed.

Sixth Embodiment

A sixth embodiment of the present invention will be described with FIGS. 13 and 14.

Figure 13:
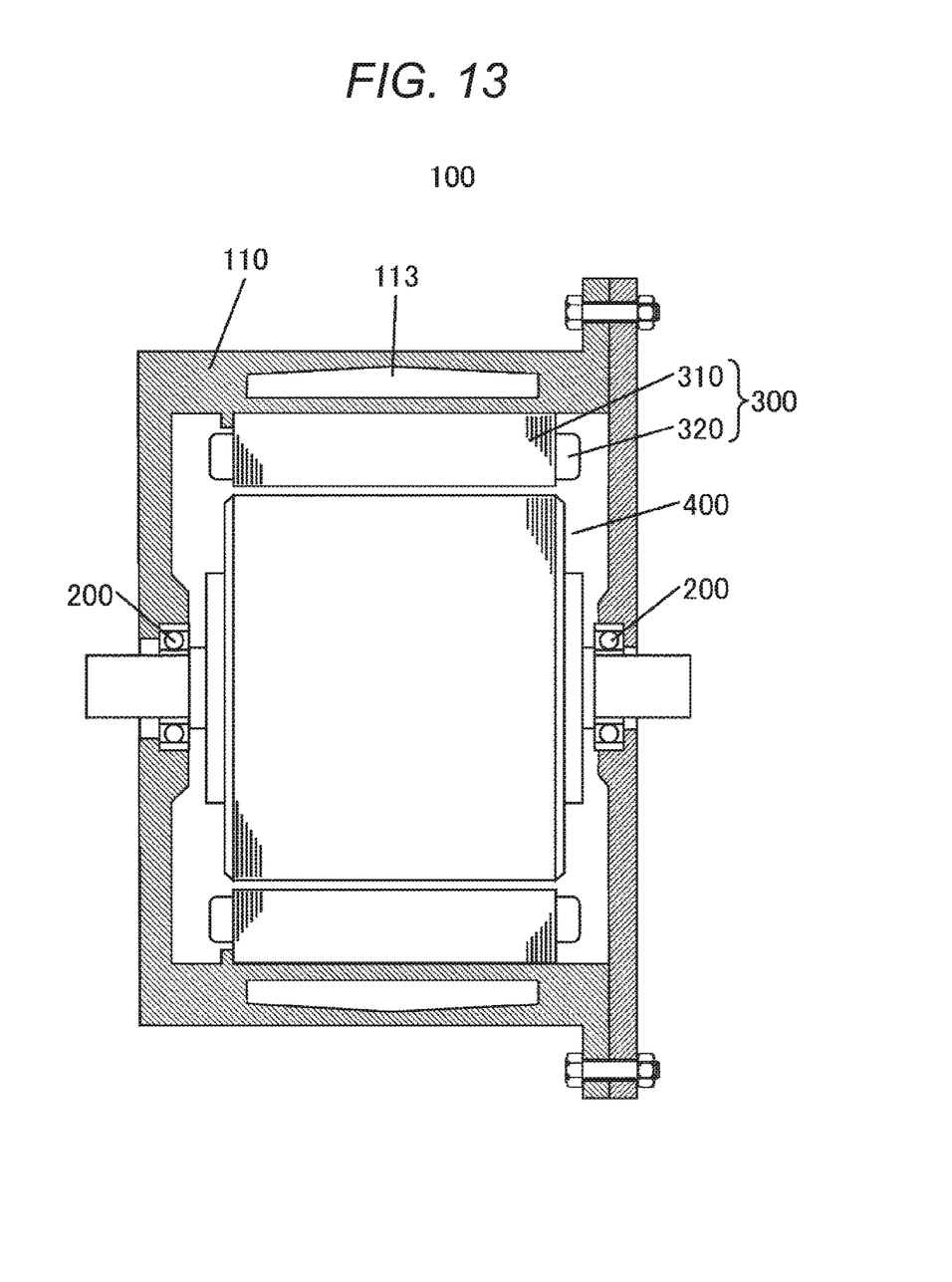
FIG. 13 is a cross-sectional view of a rotating electric machine according to a sixth embodiment.
Figure 14:
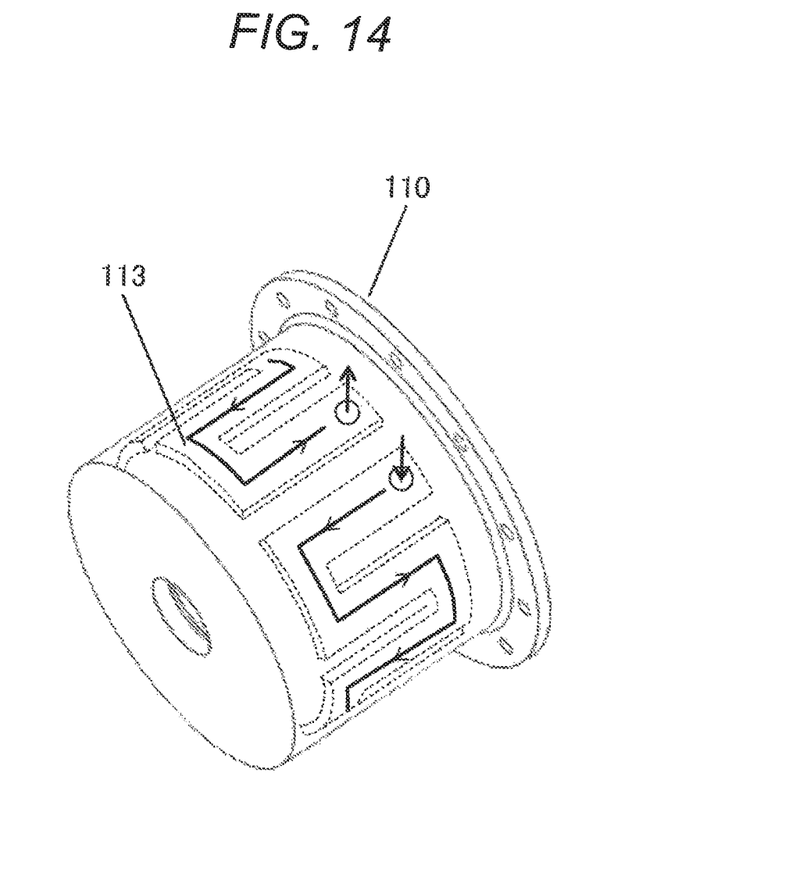
FIG. 14 is a perspective view of a housing of the rotating electric machine according to the sixth embodiment.

FIG. 13 is a cross-sectional view illustrating a rotating electric machine of the sixth embodiment of the present invention. FIG. 14 illustrates a housing 110 of the rotating electric machine of the sixth embodiment of the present invention.

In the sixth embodiment of the present invention, a cooling liquid passage 113 of the housing 110 is included in the axial direction where the height of the cooling liquid passage 113 at end portions in the axial direction is smaller than the height of the cooling liquid passage 113 at the central portion in the axial direction.

This allows for enhancing cooling performance at the end portions in the axial direction like in the first embodiment of the present invention even when the cooling liquid passage 113 in the housing 111 is a flow rate in the axial direction.

Incidentally, the present invention is not limited to the aforementioned embodiments and may include various variations. For example, the aforementioned embodiments are described in detail in order to facilitate understanding of the present invention and thus the present invention is not necessarily limited to the one including all of the configurations having been described. A part of a configuration of one of the embodiments may be replaced with a configuration of another embodiment. Also, a configuration of one of the embodiments may be added with a configuration of another embodiment. Moreover, a part of a configuration of each of the embodiments may be added with, deleted of, or replaced with another configuration.

REFERENCE SIGNS LIST 100 rotating electric machine
110 housing
111 housing inner cylinder
112 housing outer cylinder
113 cooling liquid passage
113a cooling liquid passage
113b cooling liquid passage 113c cooling liquid passage
114 seal portion
115a cooling liquid inlet
115b cooling liquid outlet
200 bearing
300 stator
310 stator core
320 stator coil
400 rotor
500 end bracket
600 cooling oil

The invention claimed is:

1. A rotating electric machine, comprising:
a stator;
a rotor rotatably held on an inner diameter side of the stator via a predetermined gap; and
a housing positioned on an outer diameter side of the stator, the housing retaining the stator and the rotor,
wherein the housing comprises a cooling liquid passage which distributes cooling liquid,
the height, in a radial direction, of the cooling liquid passage of the housing is different depending on a position in an axial direction,
the cooling liquid passage includes a plurality of rounds of liquid passages around the stator in the circumferential direction,
an inlet of the cooling liquid is included at an outer periphery of the housing and provided to the cooling liquid passage having a large cross-sectional area with a high height in the radial direction,
an outlet of the cooling liquid is included at an outer periphery of the housing and provided to the cooling liquid passage having a small cross-sectional area with a low height in the radial direction, and
the cooling liquid passage is configured to flow the cooling liquid from the inlet of the cooling liquid to the outlet of the cooling liquid so that the cooling liquid flows multiple times around the stator in the circumferential direction.

2. The rotating electric machine according to claim 1, wherein the inlet of the cooling liquid is located across at least two rounds of the cooling liquid passage from the outlet of the cooling liquid at the outer periphery of the housing.

3. The rotating electric machine according to claim 1, wherein the housing comprises:
a first cylinder positioned on the outer diameter side of the stator; and
a second cylinder positioned on an outer diameter side of the first cylinder.

4. The rotating electric machine according to claim 3, wherein an outer diameter of the first cylinder opposite to an inner diameter surface of the second cylinder gradually decreases from one side to the other side in the axial direction in an inclined manner,
an inner diameter of the second cylinder opposite to an outer diameter surface of the first cylinder gradually increases from one side to the other side in the axial direction in an inclined manner,
the outer diameter of the first cylinder is larger than the inner diameter of the second cylinder, the outer diameter of the first cylinder and the inner diameter of the second cylinder being opposite to each other, and
inserting the first cylinder in the inner diameter side of the second cylinder results in fastening the first cylinder and the stator to each other with the first cylinder fastening the stator.

5. The rotating electric machine according to claim 2, wherein the housing comprises:
a first cylinder positioned on the outer diameter side of the stator; and
a second cylinder positioned on an outer diameter side of the first cylinder.

* * * * *